United States Patent

Miyata

(10) Patent No.: US 6,540,284 B2
(45) Date of Patent: Apr. 1, 2003

(54) FRONT END CONSTRUCTION OF A VEHICLE BODY

(75) Inventor: Daizou Miyata, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/522,710

(22) Filed: Mar. 10, 2000

(65) Prior Publication Data

US 2002/0040819 A1 Apr. 11, 2002

(30) Foreign Application Priority Data

Mar. 16, 1999 (JP) .......................... 11-070205
Nov. 25, 1999 (JP) .......................... 11-334603

(51) Int. Cl.[7] ............................................. B62B 25/08
(52) U.S. Cl. ................................. 296/203.02; 180/68.4
(58) Field of Search .................. 180/68.4, 68.6; 280/781, 785; 296/203.01, 203.02, 194

(56) References Cited

U.S. PATENT DOCUMENTS

| 4,440,435 A | * | 4/1984 | Norlin ........................ 296/194 |
| 4,944,540 A | * | 7/1990 | Mansoor et al. ........... 180/68.6 |
| 5,052,742 A | * | 10/1991 | Akoshima et al. .......... 296/194 |
| 5,102,164 A | * | 4/1992 | Fujinaka et al. ............ 296/194 |
| 5,348,114 A | * | 9/1994 | Yamauchi ................... 296/194 |
| 5,358,304 A | * | 10/1994 | Kanemitsu et al. ......... 296/194 |
| 5,658,041 A | * | 8/1997 | Girardot et al. ............ 296/194 |
| 5,882,064 A | * | 3/1999 | Emmons ................. 296/203.01 |
| 5,941,329 A | * | 8/1999 | Ichioka et al. ............. 180/68.6 |
| 6,196,624 B1 | * | 3/2001 | Bierjon et al. ......... 296/203.02 |
| 6,216,810 B1 | * | 4/2001 | Nakai et al. ............... 180/68.4 |
| 6,386,624 B1 | * | 5/2002 | Schultz et al. ............. 180/68.4 |
| 6,450,276 B1 | * | 9/2002 | Latcau ....................... 180/68.4 |

FOREIGN PATENT DOCUMENTS

| DE | 4023042 | * | 1/1992 | ................ 180/68.4 |
| JP | 2-74475 A | * | 3/1990 | ................ 280/785 |
| JP | 4-63774 A | * | 2/1992 | ................ 296/194 |
| JP | 5-105115 A | * | 4/1993 | ................ 296/194 |
| JP | 7-96858 | | 4/1995 | |
| JP | 9-309460 | | 12/1997 | |
| JP | 11-139343 | | 5/1999 | |

\* cited by examiner

*Primary Examiner*—Frank Vanaman
(74) *Attorney, Agent, or Firm*—McDermott, Will & Emery

(57) ABSTRACT

Provided is a construction for attaching a front end module including a radiator core to a vehicle body. The front end module has a radiator core. The radiator core has a pair of lateral end portions which are opposed laterally and extended reward of a vehicle body to have rearward sections. A front end of the vehicle body has a pair of suspension attaching portions and a pair of front end module attaching portions adjacent the suspension attaching portions. The front end module is attached at the rearward sections of the radiator core to the front end module attaching portions of the vehicle body.

3 Claims, 3 Drawing Sheets

FRONT END CONSTRUCTION OF A VEHICLE BODY

BACKGROUND OF THE INVENTION

1. Field of the Invention

The present invention relates to a front end construction of an automotive vehicle body and particularly to an improved front end construction for attaching a front end module having a radiator core to a vehicle body.

2. Description of the Related Art

A vehicle front end construction for attaching a front end module to a vehicle body is disclosed by way of example in Japanese patent provisional publication No. 9-309460.

SUMMARY OF THE INVENTION

In case a modularized, one-piece radiator core is attached to a vehicle body in the process of body main assembly after painting, an engine compartment excluding the radiator core is assembled first. Due to this, the prior art vehicle front end construction encounters a problem in that the engine compartment lacks rigidity at the time of assembly (i.e., in the processes of body main assembly and metal line), thus deteriorating the accuracy of, particularly, the radiator core attaching portion of the front end of the engine compartment. To solve such a problem, the above described publication proposes to carry out attachment of the radiator core by temporarily attaching a jig to the front end of the engine compartment in such a manner that the jig extends laterally across the vehicle body and detaching the jig after the processes of body main assembly, metal line and painting.

However, use of such a jig causes a problem of an increased number of operation processes and a deteriorated workability.

Another problem is that in case the module is detached at the time of repair service, the vehicle body will bend due to the input (i.e., the weight of the vehicle body of itself) which is supplied thereto from the suspension, the dimensional accuracy of the vehicle front end construction is deteriorated considerably, thus making it difficult to attain accurate reattachment of the front end module.

It is accordingly an object of the present invention to provide an improved front end module attaching construction of a vehicle body which enables a front end module to be attached to a vehicle body with ease and accuracy.

It is a further object of the present invention to provide an improved front end construction of a vehicle body which is of the foregoing character.

To attain the above object, the present invention provides a front end module attaching construction of a vehicle body, which comprises a pair of front end module attaching portions of the vehicle body, which are disposed adjacent suspension attaching portions of the vehicle body, a pair of lateral end portions of a front end module, which are opposed laterally and extended rearward of the vehicle body to have rearward sections, and a device for securing the rearward sections of the lateral end portions of the front end module to the front end module attaching portions of the vehicle body.

DESCRIPTION OF THE PREFERRED EMBODIMENT

Figure 1:
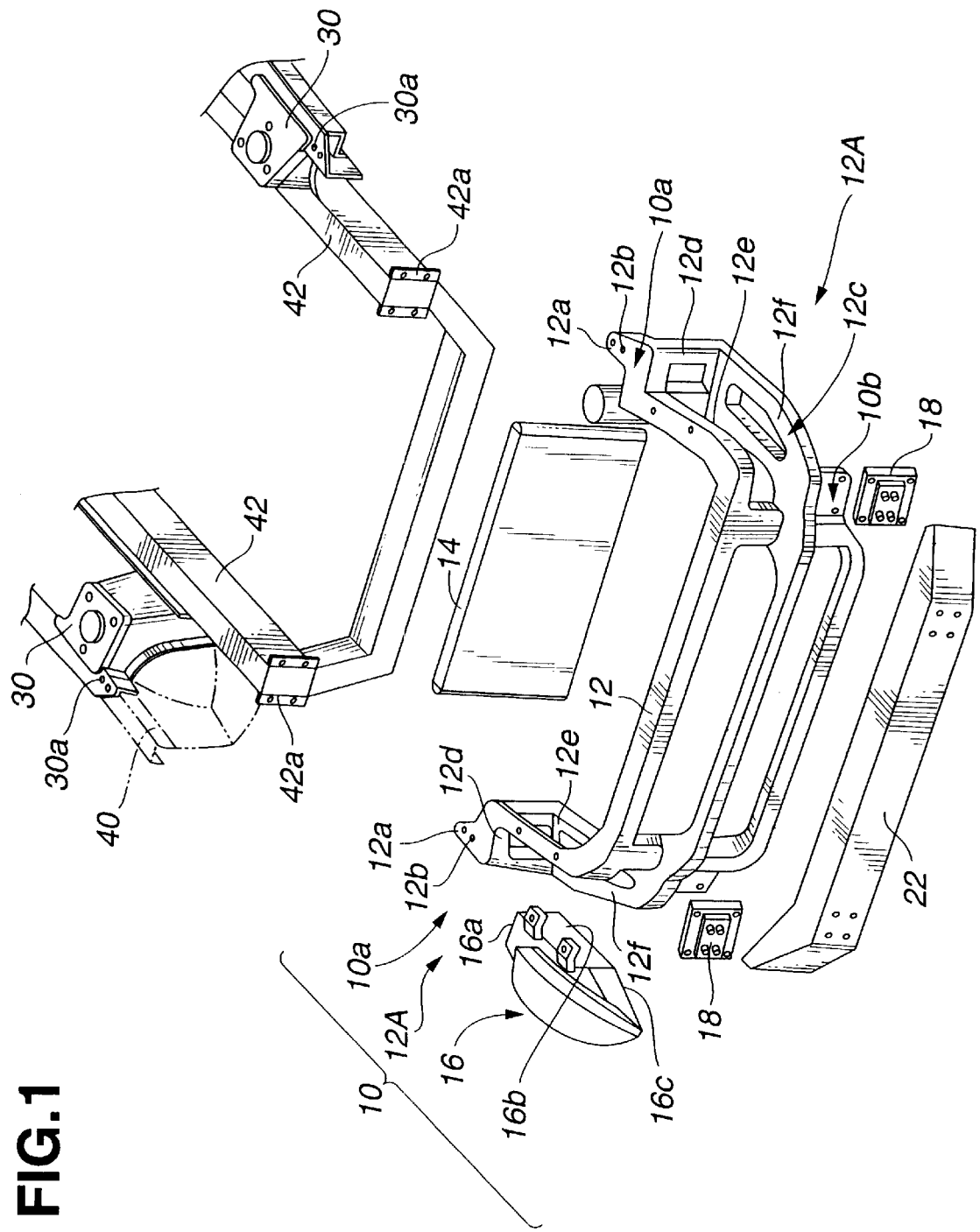
FIG. 1 is an exploded view of a front end construction of a vehicle body, having a front end module.
Figure 2:
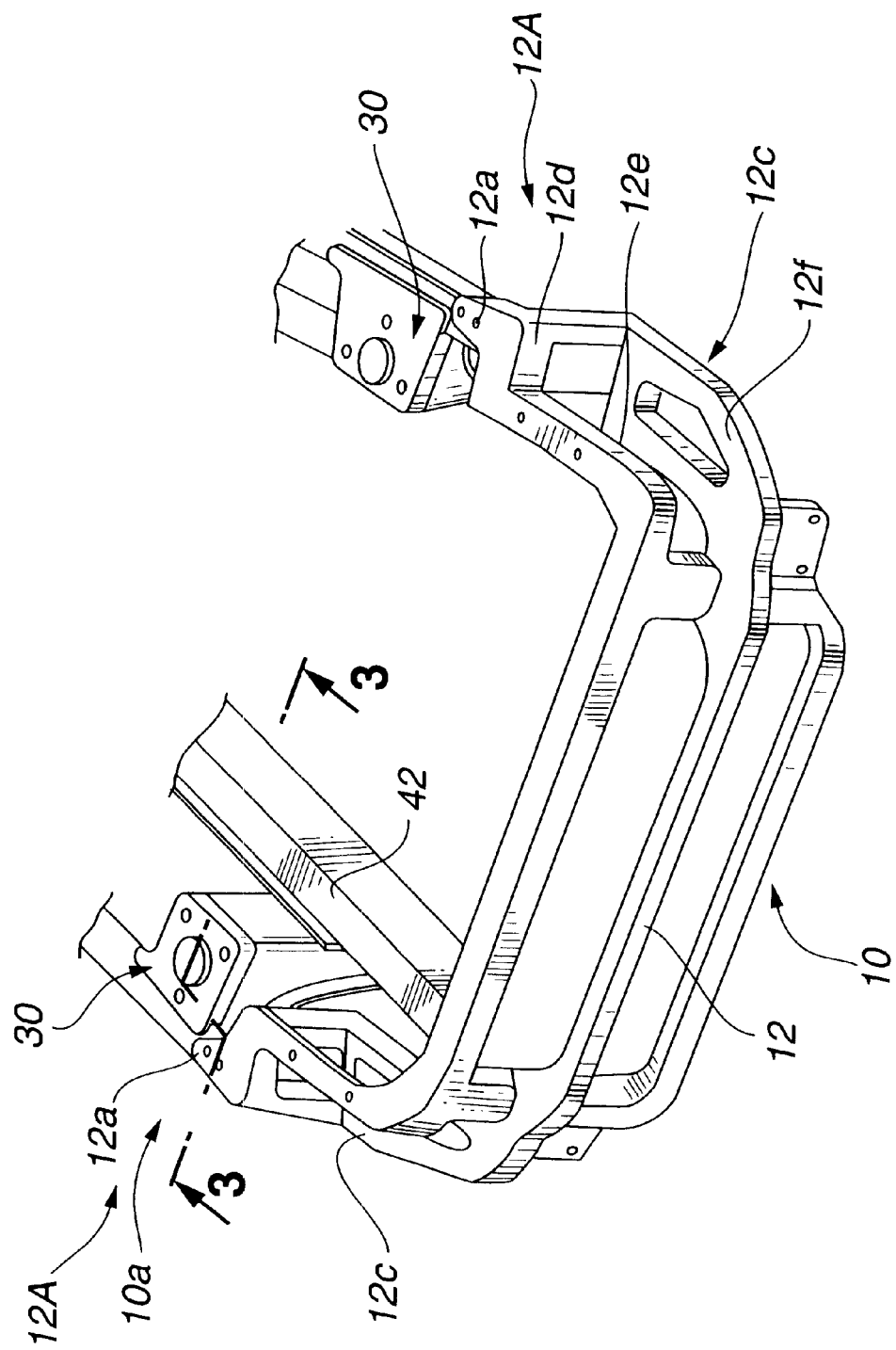
FIG. 2 is a perspective view of the front end module of FIG. 1, in a state of being attached to the vehicle body.
Figure 3:
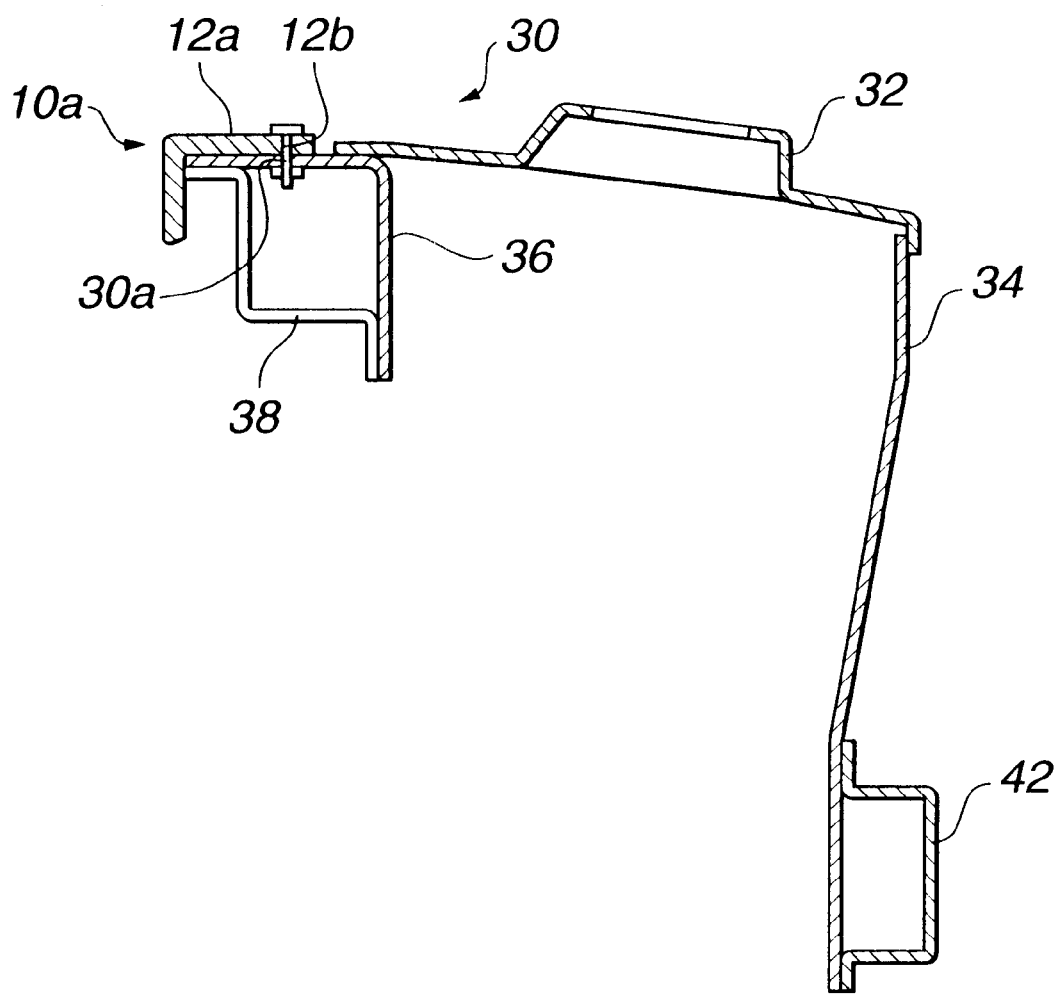
FIG. 3 is a sectional view taken along the line 3—3 in FIG. 2.

Referring now to FIGS. 1 to 3, inclusive, a front end module is generally indicated by 10 and includes a radiator core 12 made of synthetic resin such as polypropylene containing glass fibers. The radiator core 12 is of a single piece and formed by hot pressing. The front end module 10 further includes a condenser 14, a pair of head lamps 16 (though only one is shown), a pair of bumper stays 18, a bumper armature 22, etc. The parts are assembled together and modularized. However, the modularized parts are not limited to those described above but can include other parts such as a radiator, and on the contrary some of the parts described above can be deleted from the module 10.

The radiator core 12 is generally in the form of a framework composed of a plurality of frames joined together. Particularly, the radiator core 12 has at its opposite lateral end portions 12A, a pair of supporting structures 12c for supporting head lamps 16, respectively. Each supporting structure 12c has supporting surfaces 12d, 12e and 12f for supporting three surfaces of the head lamp 16, i.e., a rear surface 16a, an inboard side surface (left or right inner side surface) 16b facing widthwise of the vehicle and a lower surface 16c, respectively. Each support structure 12c is elongated longitudinally of the vehicle body so as to extend from the front terminal section (no numeral) to the rear terminal section 12a of each lateral end portion 12A of the radiator core 12. The rear terminal sections 12a of the lateral end portions 12A of the radiator core 12 are adapted to serve as attaching portions 10a of the front end module 10 which are to be attached to the vehicle body. The lateral end portions 12A are elongated and extended rearward so as to allow the rear terminal sections 12a to be positioned adjacent suspension attaching portions 30 of the vehicle body, respectively.

As shown in FIG. 3, each suspension attaching portion 30 is constituted by a strut tower made up of a suspension tower upper 32, a suspension tower lower 34, a suspension tower reinforcement inner 36 and a suspension tower reinforcement outer 38. The suspension tower reinforcement inner 36 has an attaching hole 30a at an upper horizontal portion thereof. Further, in this embodiment, a pair of hood ledge lower front panels 40 heretofore provided so as to extend forward from the suspension attaching portions 30 (though only one is shown by two-dot chain lines) are done away with.

The front end module 10 is attached at the attaching portions 10a to the portions of the vehicle body adjacent the suspension attaching portions 30, i.e., by aligning the attaching holes 12b at the rear terminal sections 12a of the above described opposite lateral end portions 12A with the respective attaching holes 30a and bolting the lateral end portions 12A and the suspension attaching portions 30 together. The front end module 10 is further attached at a pair of attaching portions 10b to the vehicle body. The attaching portions 10b are located at the laterally opposed, front terminal, lower sections of the radiator core 12, i.e., located adjacent the front terminal sections of the lateral end portions 12A. More specifically, the front end module 10 is attached at the attaching portions 10b to the vehicle body by placing the attaching portions 10b on the front ends 42a of a pair of front side members 42 of the vehicle body and bolting the attaching portions 10b and the front ends 42a together.

In the forgoing construction, it will be understood that the rear terminal sections 12a of the opposite lateral end portions 12A of the radiator core 12 of the front end module 10 are adapted to be attached to the vehicle body portions adjacent the suspension attaching portions 30 which possess high rigidity and which are treated by positioning so as to be positioned in place at the time of assembly of the vehicle body. Thus, the attaching holes 30a of the suspension attaching portions 30 can be accurate in position, thus making it possible to attach the front end module 10 to the vehicle body with ease and accuracy. Accordingly, it is no more necessitated to use a jig or the like and it becomes possible to improve the working efficiency at the time of assembly.

It will be further understood that in case of attachment or detachment of the front end module 10 at the time of repair service which is carried out with the tires being grounded, displacement of the suspension attaching portions 30 are small, so that reattachment of the front end module 10 can be done readily and easily.

It will be further understood that since the opposite lateral end portions 12A of the radiator core 12 of the front end module 10 are extended rearward to such an extend as to enable the rear terminal sections 12a to be positioned adjacent the suspension attaching portions 30, the metallic, hood ledge lower front panels 40 of the vehicle body, which have heretofore been necessitated and disposed so as to extend forward from the suspension attaching portions 30, can be dispensed with, thus making it possible to make the vehicle lighter in weight.

It will be further understood that since the supporting structures 12c for the head lamps 16 have the support surfaces 12d, 12e and 12f which are arranged three-dimensionally, the head lamps 16 can be attached with improved rigidity.

It will be further understood that since the opposite lateral end portions 12A of the radiator core 12 of the front end module 10 are provided with the supporting structures 12c having the three-dimensionally arranged supporting surfaces 12d, 12e and 12f, it becomes possible to improve the rigidity of the opposite lateral end portions 12A of the radiator core 12, which constitute the attaching portions 10a of the front end module 10.

It will be further understood that since the supporting structures 12c are extended rearward so as to allow the rear terminations thereof to be positioned adjacent the rear terminal sections 12a of the opposite lateral end portions 12A, the rigidity of the opposite lateral end portions 12A of the radiator core 12 when attached to the vehicle body can be improved further.

It will be further understood that since the supporting structures 12c are so shaped as to be elongated longitudinally of the vehicle body, the head lamps 16 can have such a shape that is elongated longitudinally of the vehicle body, thus making it possible to improve the freedom in design with respect to the shape of the head lamps 16.

It will be further understood that the strut tower which constitutes part of the suspension attaching portion 30 is positioned adjacent the upper end of the engine compartment, the attaching holes 30a for attachment of the front end module 10 are located at a high level above the ground, i.e., at the level nearly equal to the uppermost surface of the suspension attaching portion 30, thus making it possible to improve the workability at the time of attachment of the front end module 10.

The entire contents of Japanese Patent Applications P11-070205 (filed Mar. 16, 1999) and P11-334603 (filed Nov. 25, 1999) are incorporated herein by reference.

Although the invention has been described above by reference to a single embodiment of the invention, the invention is not limited to the embodiment described above. Modifications and variations of the embodiment described above will occur to those skilled in the art, in light of the above teachings.

For example, while the rear terminal sections 12a of the opposite lateral portions 12A of the radiator core 12 are adapted to serve as the attaching portions 10a of the front end module 10, the attaching portions 10a are not limited to the rear terminal sections 12a but can be other rearward sections of the lateral end portions 12A.

Further, while the supporting structure 12c is adapted to support three surfaces of the head lamp 16, i.e., the rear surface 16a, the inboard side surface 16b in the widthwise direction of the vehicle, and the lower surface 16c, this is not for the purpose of limitation but the supporting structure 12c can be structured to support at least two adjacent surfaces of the head lamp 16 except for the front surface thereof.

The scope of the invention is defined with reference to the following claims.

What is claimed is:

1. A vehicle body front end module attaching construction comprising:
   a pair of front end module attaching portions of a vehicle body, which are disposed adjacent suspension attaching portions of said vehicle body comprising at least one of a suspension tower reinforcement inner, a suspension tower reinforcement outer, and a suspension tower upper;
   a front end module having a pair of lateral end portions which are opposed laterally and extended rearwardly of said vehicle body to have rearward sections; and
   a device for securing said rearward sections of said lateral end portions of said front end module to said front end module attaching portions of said vehicle body;
   wherein said front end module includes a pair of support structures for supporting head lamps, respectively, each of said support structures having supporting surfaces for supporting a rear surface, a lower surface, and an inboard side surface of each of said head lamps, respectively, wherein portions of said support structures are formed from said rearward sections of said lateral end portions of said front end module.

2. The construction according to claim 1, wherein said support structures are elongated longitudinally of said vehicle body so as to have rear terminations located adjacent said rearward sections of said front end module, respectively.

3. In a vehicle having a front end module including a radiator core, and a pair of suspension attaching portions of a vehicle body comprising a suspension tower reinforcement inner, a suspension tower reinforcement outer, and a suspension tower upper, the improvement wherein:
   said vehicle body includes a pair of front end module attaching portions adjacent at least one of said suspension tower reinforcement inner, suspension tower reinforcement outer, and said suspension tower upper;
   said front end module includes a pair of lateral end portions which are opposed laterally and extended rearward of said vehicle body to have rearward sections; and
   said front end module is secured at said rearward sections to said front end module attaching portions of said vehicle body;

wherein said front end module includes a pair of support structures for supporting head lamps, respectively, each of said support structures having supporting surfaces for supporting a rear surface, a lower surface, and an inboard side surface of each of said head lamps, respectively, wherein portions of said support structures are formed from said rearward sections of said lateral end portions of said front end module.

* * * * *